United States Patent [19]

Mortensen

[11] 4,303,256
[45] Dec. 1, 1981

[54] BICYCLE OF THE KIND HAVING THE SEAT PLACED LOW SO THAT THE LEGS OF THE RIDER ARE SUBSTANTIALLY HORIZONTAL

[76] Inventor: Peder S. Mortensen, Box 396, Hudson, Quebec, Canada

[21] Appl. No.: 83,365

[22] Filed: Oct. 10, 1979

[30] Foreign Application Priority Data

Oct. 18, 1978 [CA] Canada ................................. 313649

[51] Int. Cl.³ ...................... B62M 1/02; B62K 21/02
[52] U.S. Cl. ................................. 280/261; 280/276; 280/281 LP; 280/281 W; 280/289 A
[58] Field of Search ............. 280/281 LP, 281 R, 261, 280/289 A

[56] References Cited

U.S. PATENT DOCUMENTS 3,664,684  5/1972  Long ............................. 280/281 LP
4,108,460  8/1978  Silva ............................. 280/281 LP

FOREIGN PATENT DOCUMENTS 103479  3/1938  Australia ..................... 280/281 LP
684233  6/1930  France ......................... 280/281 LP Primary Examiner—John P. Silverstrim

[57] ABSTRACT

This invention relates to a bicycle of the kind having the seat placed low so that the legs of the rider are substantially horizontal.

The improvements comprise a simple frame having simple connections between its members, a rear wheel suspension in which the drive chain or other means serves to limit the loads on the wheel suspension fork, a simple front wheel suspension, a steering linkage and post serving as support for a rear view mirror, a simple air cushioned seat and a baggage carrier serving as a marker to enhance visibility in traffic.

1 Claim, 2 Drawing Figures

U.S. Patent     Dec. 1, 1981     4,303,256

BICYCLE OF THE KIND HAVING THE SEAT PLACED LOW SO THAT THE LEGS OF THE RIDER ARE SUBSTANTIALLY HORIZONTAL

This invention relates to an improved bicycle of the kind on which the seat is placed low so that the legs of the rider are substantially horizontal, as described by Harold Jarvis in U.S. Pat. No. 690733, improved so as to make it a practical operable vehicle of such simplicity that it may be produced economically.

A bicycle of such a configuration is aerodynamically efficient and well suited for the provision of an enclosure of low aerodynamic drag, to make it even more efficient.

Provision of such an enclosure may more than double the average speed of such a bicycle, raising it from about 25 kilometers per hour to about 50 kilometers per hours. In other words it enables man to propel himself comfortably by his own muscles at about twice the speed of an ordinary bicycle, thus achieving the next step from that of an ordinary bicycle, which enables man to move at about twice the speed of walking.

Figure 1:
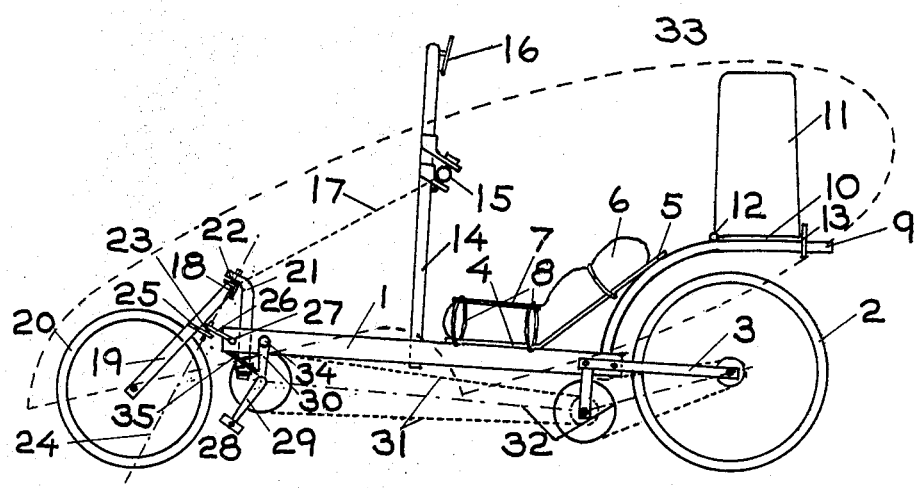
Figure 2:
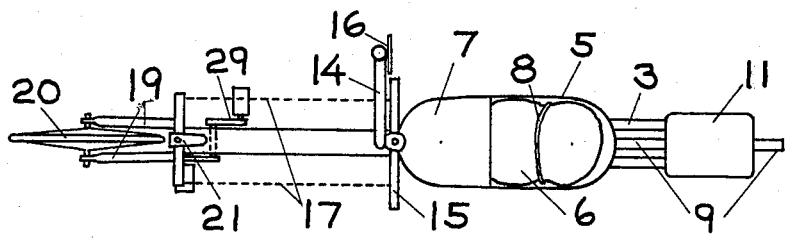

The advantages of my invention will become apparent from the following description used to illustrate the preferred embodiment of the invention as read in connection with the accompanying drawing in which:

FIG. 1 is a side view of the bicycle;
FIG. 2 is a plan view of the bicycle.

Refering now to the drawing wherein the showings are for the purpose of illustrating the preferred embodiment of the invention only and not for the purpose of limiting same:

The main member 1 in the frame is a substantially horizontal tube of high torsional stiffness, in the preferred embodiment it is an exstruded aluminum of about 3 inches in diameter. The rear wheel 2 is attached to two smaller tubes 3, attached, one on each side, to the main member.

The seat comprise a bottom part 4, with a back rest 5, made from flat sheet such as plywood. An air bladder 6, in the preferred embodiment an inner tube from an automobile tire, is resting on the bottom part and back rest. A top part 7, made from flat sheet such as plywood, is resting on the air bladder and is connected to the bottom part by means of cords 8, passing outside of the air bladder, thus keeping it in place. The rider is seated on the top part and is thus separated from the frame by the air bladder.

The back rest part of the seat is supported and connected to a tube 9, penetrating the main member and extending upward therefrom while being curved backward over the rear wheel to point backwards in a substantially horizontal direction. Attached to this horizontal part of the tube is a baggage carrier comprising a flat bottom part 10 to which a top part 11, consisting of an upside down trash can of the type designed to fit around standard grocery bags, is hinged at the front end 12 and fitted with a locking device 13 at the rear.

Such trash cans are available, made from light weight plastics, in many bright colors. Thus a simple weather protective baggage carrier is provided, which at the same time is highly visible in traffic.

An appropriate distance in front of the rider another tube 14 is penetrating the main member and extending upwards to support a steering bar 15, and is extending further upwards while being bent to one side and supporting a rear view mirror 16 at its top end.

The steering bar is connected by means of two cables 17 to a parallel cross member 18 attached to the top end of the fork 19 carrying the front wheel 20. The fork comprise two straight tubes, and the vertical wheel loads are transferred to the main member by means of an upward extending tube 21, penetrating it and having a necklike forward bend at its top to which the fork is connected by means of a trust bearing 22 located on the cross member between the fork tubes.

Lower down the fork another bearing 23 is located a certain distance backwards from the tubes, thus making the hinge line 24, defined by the two bearings, go through the point where the front wheel touches the road. This lower bearing being connected to the fork tubes by means of a gusset 25, while another gusset 26 is connecting the bearing to the main member through an articulated connection 27 to provide free up and down movement of the fork.

This connection arrangement gives a certain flexibility for up and down forces on the front wheel, and it also allows a spring 28 to be provided, if desired, where the tube with the neck like top penetrates the main member.

A pedal crank 29 is attached to a carrier 30, located below the main member an appropriate distance in front of the rider. The carrier having a horizontal shaft 34, penetrating the main member and about which the carrier may pivot to tighten the drive chains or other means by means of a tightener 35.

The chains or other means being located so that their centerline 32 is below the two rear fork tubes, thus serving to limit the bending loads on the tubes.

An enclosure 33, having low aerodynamic drag, is outlined.

It is obvious that an adjustment for different lengths of the riders legs and arms may be accomplished by providing holes at various locations in the main member for the penetrating tubes 9 and 14.

It is also obvious that the two cables 17 may be tightened or slackened by positioning the steering bar at different heights on the tube 14.

The embodiments of the invention in which an exclusive property or privilege is claimed are defined as follows:

1. A bicycle comprising:
   a main frame member including a substantially horizontal tube of high torsional stiffness;
   a rear fork including two substantially horizontal tubes attached to said mainframe member and a rear wheel mounted between said horizontal tubes;
   a seat including a bottom flat sheet connected to said main frame member, a back rest flat sheet, an air bladder resting on said bottom flat sheet and said back rest flat sheet, a top flat sheet resting on said air bladder, and cords passing around said flat sheets and said air bladder for holding them together;
   a first tube penetrating said main frame member behind said bottom flat sheet and curving upwardly and rearwardly for supporting said back rest flat sheet;
   a baggage carrier including a flat bottom part mounted at the rear end of said first tube, an upside down can of highly visible color pivotally hinged to said flat bottom part, and means for releasibly locking said can in an upright position preventing pivoting thereof;

a second tube penetrating said main frame member in front of said seat, said second tube having a first, substantially vertically extending portion and a second vertically and laterally extending portion extending from said first portion;

a steering bar supported on said first portion;

a rear view mirror mounted on said second portion;

a third tube penetrating said main frame member at the front thereof and curving upwardly and forwardly;

a spring resiliently mounting said third tube to said main frame;

a front fork including a cross bar, a first thrust bearing pivotally mounting said cross bar to said third tube, two straight tubes connected to said cross bar and extending downwardly and forwardly therefrom, a front wheel mounted between said two straight tubes, a first gusset plate connected to said two straight tubes, a second gusset plate pivotally connected to said main frame member, and a second bearing interconnecting said first and second gusset plates, said first and second bearings being aligned to form a steering axis extending through the point where the front wheel touches the ground; cable means interconnecting said cross bar to said steering bar for transmitting steering control therebetween;

a pedal crank mounted on said main frame forward of said seat whereby the legs of the rider are substantially horizontal in the actuation of said pedal crank; and means for transmitting drive power from said pedal crank to said rear wheel, the centerline of said transmitting means being positioned below said rear fork tubes whereby the bending loads on said fork tubes is limited.

* * * * *